United States Patent
Pan

(10) Patent No.: US 9,983,997 B2
(45) Date of Patent: May 29, 2018

(54) EVENT BASED PRE-FETCH CACHING STORAGE CONTROLLER

(71) Applicant: Futurewei Technologies, Inc., Plano, TX (US)

(72) Inventor: Weimin Pan, Spring, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 216 days.

(21) Appl. No.: 14/809,000

(22) Filed: Jul. 24, 2015

(65) Prior Publication Data

US 2017/0024322 A1  Jan. 26, 2017

(51) Int. Cl.
*G06F 12/0862* (2016.01)
*G06F 12/0868* (2016.01)

(52) U.S. Cl.
CPC ...... *G06F 12/0862* (2013.01); *G06F 12/0868* (2013.01); *G06F 2212/1016* (2013.01); *G06F 2212/312* (2013.01); *G06F 2212/6024* (2013.01)

(58) Field of Classification Search
CPC ......... G06F 12/0862; G06F 2212/6026; G06F 2212/602; G06F 2212/6022; G06F 2212/6024; G06F 12/0868; G06F 2212/1016; G06F 2212/312
USPC ........................................................ 711/137
See application file for complete search history.

(56) References Cited

U.S. PATENT DOCUMENTS

| | | | | |
|---|---|---|---|---|
| 5,305,389 A * | 4/1994 | Palmer | ................ | G06F 12/0862 382/100 |
| 5,887,151 A * | 3/1999 | Raz | ........................ | G06F 9/383 712/205 |
| 7,370,153 B1 * | 5/2008 | Danilak | ................ | G06F 13/385 711/111 |
| 7,725,658 B2 * | 5/2010 | Lang | .................... | G06F 12/0862 600/300 |
| 7,873,792 B2 * | 1/2011 | Anand | .................... | G06F 12/08 711/137 |
| 8,214,599 B2 * | 7/2012 | de la Iglesia | ....... | G06F 12/0862 711/100 |
| 8,533,422 B2 * | 9/2013 | Subramaniam | ....... | G06F 9/3816 711/105 |

(Continued)

OTHER PUBLICATIONS

Yin J., Alvisi L., Dahlin M., Iyengar A., "Engineering server-driven consistency for large scale dynamic Web services", May 1-5, 2001, Proceedings of the 10th international conference on World Wide Web, p. 45-57, Hong Kong, Hong Kong.*

(Continued)

*Primary Examiner* — Reginald G Bragdon
*Assistant Examiner* — Aaron D. Ho
(74) *Attorney, Agent, or Firm* — Vierra Magen Marcus LLP

(57) ABSTRACT

A cache management system and method allowing data stored in non-sequential storage blocks on a storage system to be retrieved to a cache memory in advance of a call for the data based on a defined event in a host. The system and method detects a defined event from the host. The defined event issues an event read sequence of read requests for data from non-sequential storage blocks of a storage system. The event data read sequence of read requests is recorded to create a pre-fetch list. The read requests in the event read sequence are then issued for the pre-fetch list associated with the defined event to store the requested data in the cache memory.

20 Claims, 6 Drawing Sheets

(56) References Cited

U.S. PATENT DOCUMENTS

| | | | | |
|---|---|---|---|---|
| 9,304,928 | B2* | 4/2016 | Udayashankar | G06F 12/0862 |
| 2005/0114608 | A1* | 5/2005 | Oshima | G06F 12/0862 |
| | | | | 711/137 |
| 2011/0320415 | A1* | 12/2011 | Berger | G06F 17/3048 |
| | | | | 707/692 |
| 2014/0379990 | A1 | 12/2014 | Pan | |
| 2015/0081967 | A1 | 3/2015 | Pan | |

OTHER PUBLICATIONS

Rutt B., Parthasarathy S. "Exploiting Recurring Usage Patterns to Enhance Filesystem and Memory Subsystem Performance", 2004, In: Dai H., Srikant R., Zhang C. (eds) Advances in Knowledge Discovery and Data Mining. PAKDD 2004. Lecture Notes in Computer Science, vol. 3056. Springer, Berlin, Heidelberg [DOI>https://doi.org/10.1007/978-3-540-24775-3_59].*

"Hypervisor," Wikipedia the free encyclopedia, downloaded from https://en.wikipedia.org/wiki/Hypervisor on Mar. 10, 2016, 7 pages.

Bhosale, Shivaji D., et al., "IBM Power Systems SR-IOV: Technical Overview and Introduction," IBM Redpaper, Jul. 2014, 84 pages.

* cited by examiner

FIG. 4

| Name | Type | Description |
|---|---|---|
| EventIdentity | Byte | Unique Number Identifying Event |
| EventDetectionAPI | Pointer | A method to detect the Event |
| EventAssociated LUNs | Byte | LUNs affected by this event that storage controller records for IO activity after first detecting this event. |
| PrefetchIOListValid | Bood | Recorded prefetch read IO list is valid |
| PrefetchIONumber | Byte | Number of host read requests to record in prefetch read IO list after event |
| PefetchDataRetentionTime | DWORD | Retention time the controller should keep the prefetch data in read cache |
| PrefetchCacheHitThreshold | DWORD | Threshold for hit rate below which read IO list is marked invalid. |
| PrefetchIOList | LinkList | Recorded read IO link list (LUN number, Start LBA and Block IDs) |

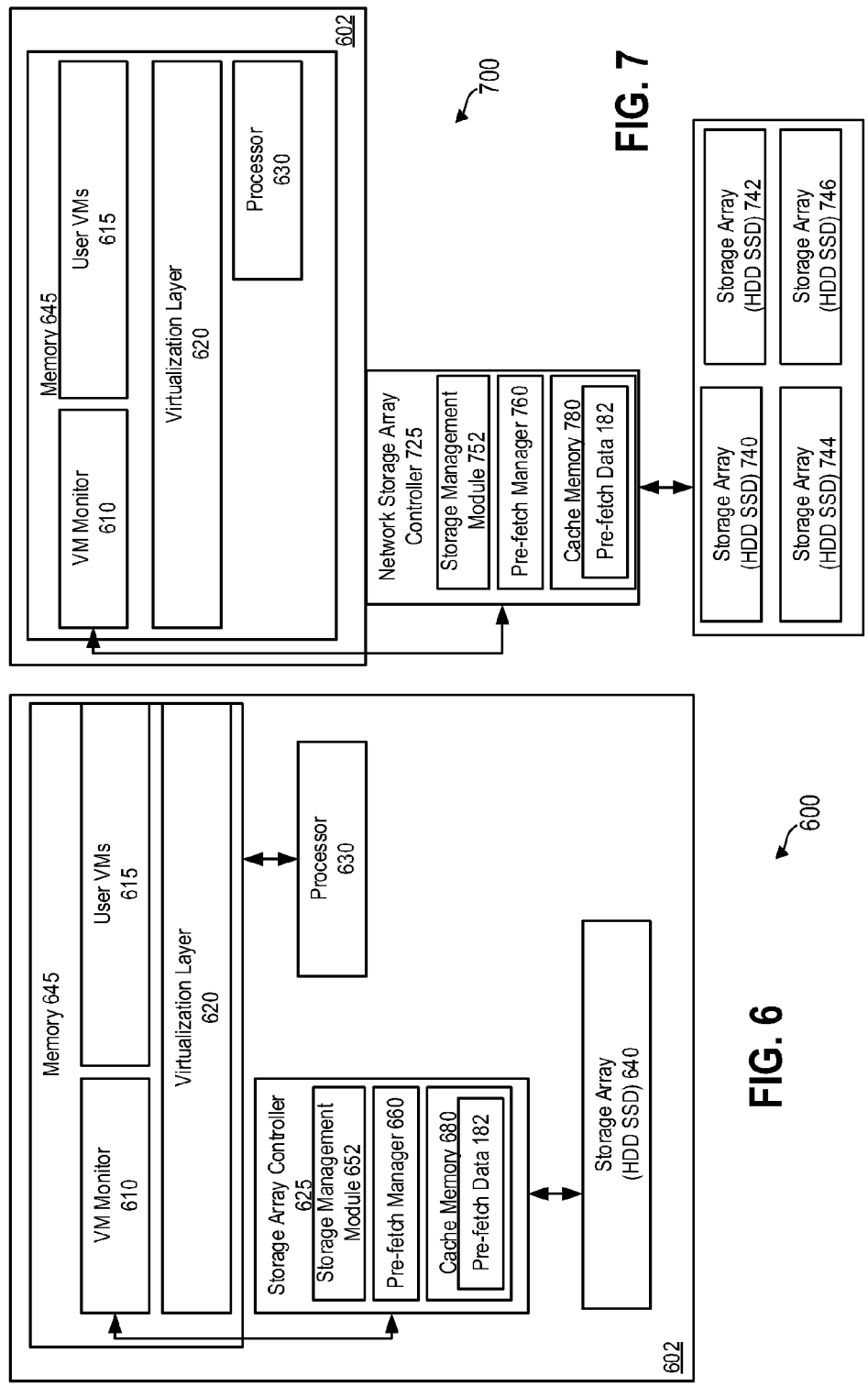

EVENT BASED PRE-FETCH CACHING STORAGE CONTROLLER

BACKGROUND

Cache memories are used in a variety of systems where an improvement in read/write performance would advantageous. In storage applications, a read ahead cache is generally useful to improve read performance in sequential reads where the data to be read is stored in a sequential series of blocks on a storage device or storage medium. Storage devices include hard disk drives, solid state drives, and drive arrays coupled directly to host computing device as well as coupled via a network. Storage controllers are configured to allow hosts to communicate with storage devices to gain access to data of storage devices and may handle requests from the hosts to read data from and write data to the storage devices. The storage devices may be configured as storage volumes which may allow the host to interface with storage using a logical address (or logical block address (LBA)) and without having to have knowledge of the physical layout or structure of the storage devices. The host may send multiple read requests to the storage controller which the controller then processes to access to the storage device.

SUMMARY

The technology, briefly described, provides a cache management technology which allows data stored in non-sequential blocks on a storage system to be returned to a cache in advance of a call for the data based on a defined event in a host device. One embodiment of the technology includes a storage controller having a data pre-fetch manager which retrieves non-sequential read data from a storage system for a host event to a cache memory. In one embodiment, the storage controller includes a processor implemented method for pre-fetching non-sequential read request data to a cache memory. The method detects a defined event from a host. The defined event issues an event read sequence of read requests for data from non-sequential storage blocks of a storage system. The event data read sequence of read requests is recorded to create a pre-fetch list. The read requests in the event read sequence are then issued for the pre-fetch list associated with the defined event to store the requested data in the cache memory.

In another embodiment, a storage controller coupled to a host and a storage system includes a cache memory and a cache controller operably coupled to the cache memory. The storage controller includes an event detector adapted to detect a defined event issued by the host. The defined event issues read requests for data from non-sequential storage blocks of the storage system. A pre-fetch controller in the storage controller is adapted to create a pre-fetch list associated with the defined event. The pre-fetch controller records the read requests for the defined event to create the pre-fetch list and sets the pre-fetch list as a valid pre-fetch list. The pre-fetch controller issues each of the read requests for any valid pre-fetch list associated with the defined event. The pre-fetch controller stores data returned responsive to the read requests in the cache memory.

Further, a storage controller coupled to a storage system is provided. The storage controller includes code operable to instruct the storage controller to perform steps to pre-fetch data to a cache memory. The controller includes code operable to record read requests from a host to the storage system to a pre-fetch list. The read requests are based on a defined event which requests data from non-sequential storage blocks of the storage system. In addition, the controller includes code operable to determine, in response to a subsequent occurrence of the defined event, whether the pre-fetch list is valid. The controller further includes code operable to read the pre-fetch list and issue the read requests to the storage system upon a subsequent occurrence of the defined event to store data associated with the read requests in a cache memory.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a table illustrating a metadata record associated with each defined pre-fetch event.

FIG. 6 is a block diagram illustrating a first virtual host system and virtual storage controller in accordance with the present technology.

FIG. 7 is a block diagram illustrating a second virtual host system and a network storage controller in accordance with the present technology.

DETAILED DESCRIPTION

Figure 1:
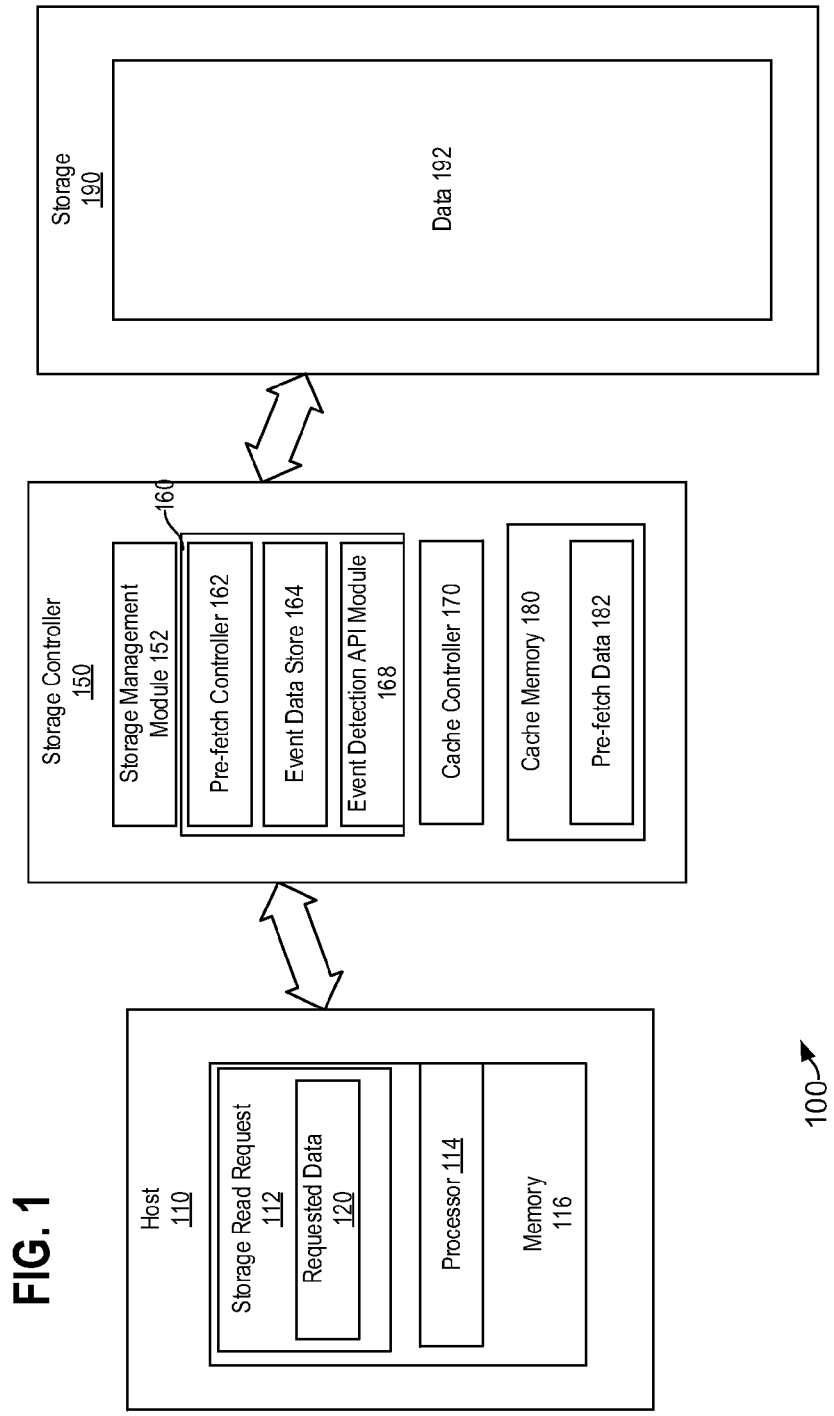
FIG. 1 is a block diagram illustrating a system for management of storage requests in accordance with the present technology.

Technology is presented to improve performance of storage systems responding to read requests from host devices in myriad applications. The cache memory management technology provides pre-fetching of non-sequentially stored data used for a host system event based on a definition of the event which stores a list of the read requests. Pre-fetching of non-sequentially stored data may also be referred to as reading ahead of non-sequentially stored data. The read requests are used to store the non-sequentially stored data to a cache memory prior to a subsequent occurrence of the defined event. The cache management technology may be utilized in any type of cache memory system, but is described herein with respect to a computing host and a storage controller. The technology is particularly useful in virtual computing operations where multiple virtual clients attempt to access storage devices simultaneously during certain types of events, such as virtual device boot sequences and virus scan operations.

The technology includes a storage controller which pre-fetches data for any of a number of pre-defined events which issue read requests for data in non-sequential storage blocks of a storage system. The pre-fetched data is stored in a cache memory, allowing the data to be returned to the host more rapidly than were the data read and returned from the storage system. The storage controller detects a defined event from a computing host. The defined event is one which has been determined to be likely to issue read requests for data from non-sequential storage blocks of a storage system. The read requests for requested data are recorded to create a pre-fetch list. Data from the read requests can be stored to the cache memory by issuing each of the read requests in a sequence of read requests used by the event for any valid pre-fetch list associated with the defined event. The issuing can occur on a subsequent occurrence of the defined event or upon detection of the first occurrence of the defined event.

The technology is applicable in cases where non-sequential read requests by a host to a storage device occur. Non-sequential read requests may also be called random read requests. Some read requests generated by hosts to a storage controller include requests that request data from non-continuous or non-sequential storage blocks. As such, a storage controller may generate multiple read requests to retrieve the requested data blocks from the storage device and such multiple requests may have a negative impact on performance.

In accordance with the technology, events having read requests are defined and for each defined event, the storage controller may record the read request operations and write the requested data blocks to a cache memory associated with the storage controller to allow for return of the data blocks back to the host in case of a subsequent read request based on a subsequent occurrence of the same defined event. In this manner, the storage controller may allow for the return of the data from the cache memory to the host in case of a subsequent read request. The storage controller may be able to avoid having to generate another read request directed to storage device which may improve performance.

FIG. 1 depicts a first exemplary system 100 utilizing the technology to manage storage read requests. The system 100 includes a storage controller 150 which may be coupled to any type of host 110. Host 110 may include any type of computing device including a personal computing system, a notebook computer, a desktop computer, a mobile computing device, a server, a network device, and the like. In the embodiment of FIG. 1, storage controller 150 communicates with host 110 and storage device 190. Host or host system or computing host or host device 110 may also include a processor 114 and memory 116. The processor 114 is operable to interact with memory 116 to execute instructions which may generate a storage read request 112 to the storage controller 150. Each storage read request 112 will return requested data 120 from storage 190 through the storage controller 150.

While the technology will be described herein with respect to a computing host and a storage controller used in conjunction with storage systems, in other embodiments, the host may include a processor having a processor cache memory and the storage system may be any type of non-volatile storage accessed by the processor. In such embodiments, the processor may include a "host" and the storage controller is incorporated into the processor such that pre-fetch data needed by the processor in non-sequential blocks is returned to the processor cache.

The storage controller is illustrated as including a storage management module 152, a pre-fetch manager 160, a cache controller 170, and a cache memory 180. Pre-fetch manager 160 may include a pre-fetch controller 162, an event data store 164, and an event detection API module 168.

The storage controller 150 may be configured in, for example, a hardware device including electronic circuitry for implementing the functionality described herein, such as control logic and/or programmable memory. In addition to or as an alternative, the storage controller 150 may be implemented as a series of instructions encoded on a machine-readable storage medium and executable by a processor. For example, storage controller 150 may independently run an application and/or operating system (OS) for interfacing to storage device 190. The storage controller 150 may connect to host 110 to receive requests for access to storage device 190. The requests may include requests to write data blocks to storage device 190 and requests to read data blocks from the storage device.

The storage device 190 is shown having data 192 which may include groups of bits or bytes stored in a logically addressable manner on the storage system. The storage device 190 may include a plurality of storage media which may be any electronic, magnetic, optical, or other physical storage media that contains or stores data such as one or more hard disk drives (HDD), solid-state drives (SSD) and the like.

In one example, storage controller 150 may configure storage device 190 through a virtualization process to virtualize the storage device to have storage volumes. In this manner, host 110 may access data blocks on storage device 190 through storage volumes that span multiple physical storage devices without having to have knowledge of the physical structure of the storage devices. In one example, storage controller 150 may communicate with storage device 190 through any communication means such as Serial Attached SCSI connection and may communicate with host 110 through any communication means such as via a Peripheral Component Interconnect (PCI) connection and the like. The storage device 190 may further be based on a number of drives of the storage device that storage controller 150 is to access per request. For example, the plurality of storage drives of the storage device 190 may define a structure referred to as a redundant array of independent disks (RAID). In another example, storage device 190 may be configured as storage volumes. The storage volumes may be formed based on a virtualization process that includes mapping logical block address (LBA) to physical address of locations on physical storage devices such as hard disk drives. The host 110 may access storage device 190 using logical address without having to need to manage or know the physical address layout of the storage device 190.

The storage controller 150 may exchange commands and data with host 110. For example, the storage controller 150 may receive a plurality of requests from host 110 which may include read and/or write accesses to sequential and/or random addresses of locations associated with data blocks stored on storage device 190. The storage controller 150 may be configured to communicate with storage device 190 over a storage interface to exchange command and data over a bus or other connection.

The storage controller 150 includes a storage management module 152 configured to manage storage read requests between host 110 and storage device 190. The storage management module 152 may be configured to implement the techniques of the present application in conjunction with the pre-fetch manager 160.

The storage management module 152 communicates with host 110 for storage and retrieval of data which may be organized in data blocks in a storage medium of storage device 190. The storage management module may further communicate with cache memory 180 to return data previously stored in cache memory 180 as a result of a prior read request issued by host 110, the data for which is returned to cache memory 180. As such, the cache memory 180 may be used by storage controller 150 to store read data from the storage device 190 and return the data to host 110. The cache memory 180 may have a lower latency than that of the storage device 190. For instance, cache memory 180 may include random access solid state memory which is coupled via a faster communication bus to the host, while the storage device 190 may include a hard disk drive (HDD) coupled by one or more busses to the host 110.

The storage management module 152 may be configured to check if a defined event associated with read requests has previously occurred and whether a pre-fetch of data associated with the event has been stored in cache memory 180, so that data may be returned in response to the read request from the cache memory. The storage management module 152 may be configured to manage multiple read requests to retrieve the requested data blocks from storage device 190.

The storage controller may further include a cache controller 170. Cache controller 170 may direct data in response to read requests made to storage device 192 to cache memory 180, storing such data as pre-fetch data 182. The cache controller 170 generally manages various aspects of host and other controller interfaces with cache memory 180. This may include responding to read requests, responding to requests for information concerning reads and writes to the cache memory, implementing a cache write policy, implementing a cache clean-up policy, determining if memory request is cacheable and determining if a read request to the cache is a cache hit or cache miss. A cache hit occurs when the requested data can be found in a cache, while a cache miss occurs when it cannot. Cache hits are served by reading data from the cache.

The cache controller is also responsive to the pre-fetch manager 160 to store data retrieved by the pre-fetch manager in accordance with the technology has described herein.

Pre-fetch manager 160 includes a pre-fetch controller 162, an event data store 164, and an event detection API module 168. Pre-fetch controller 162 operates in conjunction with the storage management module 152 to determine, in accordance with the teachings described below with respect to FIGS. 2 and 3, for example, whether or not certain data should be retrieved from storage device 190 based on events generated by the host 110.

The pre-fetch controller 162 is configured to read an event read sequence of read requests detected by the event detection API module 168 and create a pre-fetch list associated with the defined event which may be stored in an event record in the event data store 164. The pre-fetch controller 162 is configured to determine whether or not a pre-fetch list for a defined event is valid. A pre-fetch read list in a data record may exist where a defined event has previously occurred. A pre-fetch list includes a list of read requests associated with a defined event which were previously issued to retrieve data for an occurrence of a defined event. The pre-fetch controller 162 is configured to perform pre-fetch data maintenance. The pre-fetch controller 162 is configured to mark a pre-fetch list is marked valid or invalid during the pre-fetch data maintenance. The pre-fetch controller 162 is configured to replayed pre-fetch list events to retrieve data from each of the read requests and communicate with cache controller 170 to store data in the cache memory 180.

The event data store 164 is configured to store defined event definitions and event data including a pre-fetch list which is recorded by the pre-fetch controller. An example of event data 400 stored in event data store 164 for each defined event type is illustrated in FIG. 4. With reference to FIG. 4, each defined event record 400 has an event identity, EventIdentity, defined as a series of bytes, specifying a unique number identifying the event. The EventDetectionAPI pointer is a pointer to the method in the event detection API module 168 which is used to detect the event from the host system. The EventAssociatedLUNs are the logical unit numbers (LUNs) affected by this event that the pre-fetch controller records for input/output I/O activity after first detecting this event. A LUN is a unique identifier to designate an individual or collection of physical or virtual storage devices that execute I/O commands with a host computer. The PrefetchIOListValid is a Boolean operator indicating whether or not a pre-fetch list is valid or invalid and is set in accordance with the discussion with respect to FIG. 3. PrefetchIONumber is a number of read requests to record in a pre-fetch read list after detecting an event. This number may be defined in accordance with the resources available to store event data records. PefetchDataRetentionTime is a data word specifying the retention time for which the controller keeps the pre-fetch data in the cache memory 180. PrefetchCacheHitThreshold is the threshold hit rate below which the I/O list is marked invalid. PrefetchIOList is a linked list of recorded read I/O links which includes, for each event, the LUN number, start LBA, and number of blocks.

The event detection API module 168 serves as an event detector for a defined event, and is configured to detect an occurrence of a pre-defined event by providing an interface whereby a host may communicate the occurrence of a read event to the pre-fetch manager 160. The event detection API module 168 is configured to detect a host event based signals from the host to the API that a defined event has occurred. The event detection API module 168 is configured to determine one or more system events identifying an associated non-sequential read operation.

Figure 2:
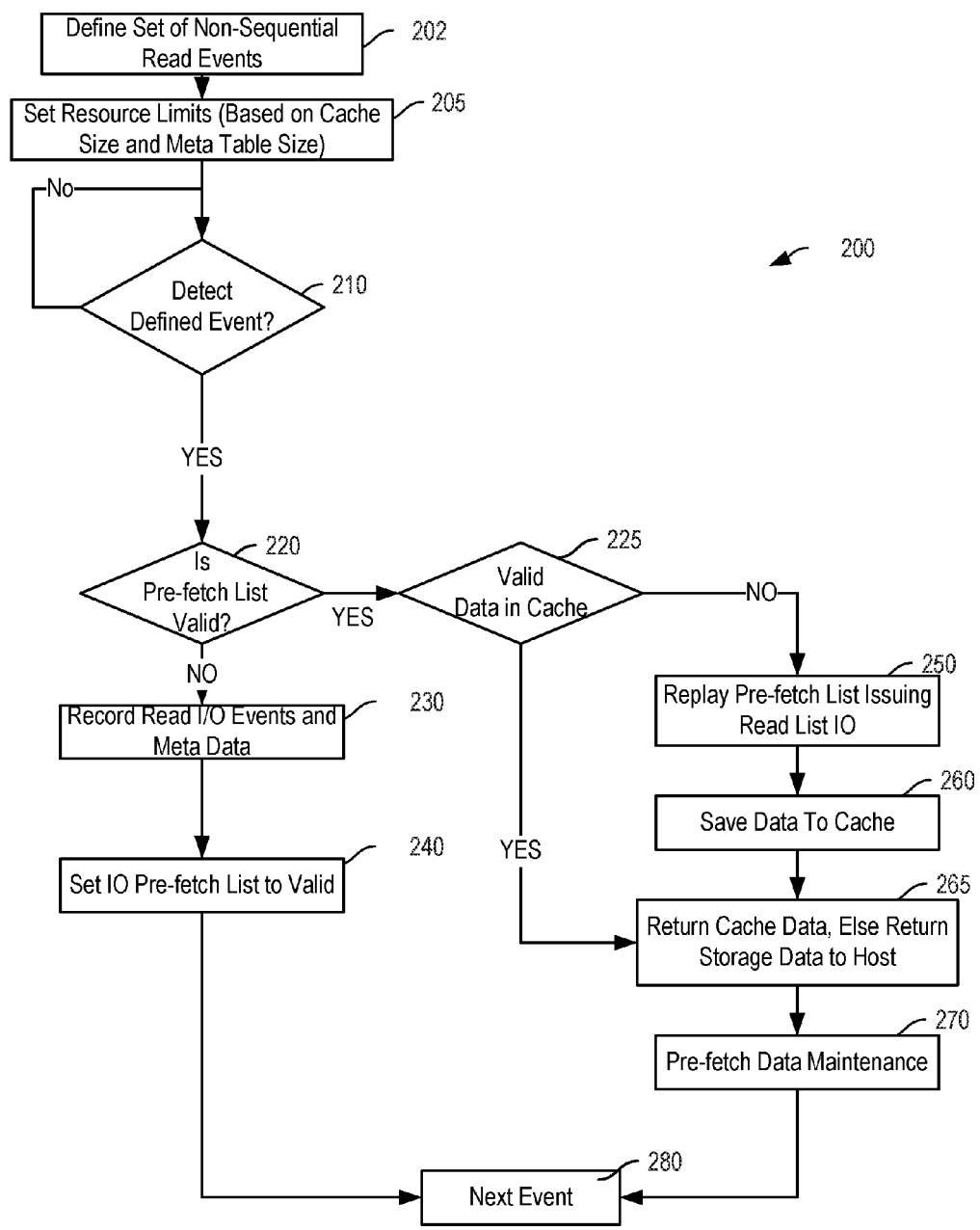
FIG. 2 is a flowchart of a process performable by a storage controller in a system for managing storage requests in accordance with the present technology.

FIG. 2 illustrates an exemplary process 200 which may be performed at least partially by the storage controller and in particular pre-fetch manager 160 in order to retrieve event-based asynchronous read data into cache memory 180. In some implementations, such process 200 may be conducted by the previously-mentioned storage controller 150 and the various components thereof as described herein.

At 202, one or more events which may request non-sequential blocks of data from data 192 are defined. Definition of a non-sequential read event includes creation of a record such as that illustrated in FIG. 4 for each defined event. Any number of defined events may be specified. The number of events which may be defined is limited only by system resources of a processing system such as a storage controller used to implement the present technology. A definition of a non-sequential read event may be stored in event data store 164. The event definition record is used by the pre-fetch controller 162 to store non-sequential read data for each read event in cache memory 180 for use by host 110 in response to a subsequent call for the event. Defined events may be any of a number of different types of events, including a hardware system boot, a virtual system boot, a processing system virus scan, a virtual device virus scan or any even which may generate non-sequential read requests from host 110. Definition of read events may be pre-defined in the storage controller and may be dynamically updatable as applications for the storage controller or host change over time.

At 205, optionally, resource limits may be set for each of the defined events. Resource limits are defined based on the size of the cache memory 180, the size of the event data store 164, and well as other factors such as whether not limiting a particular resource would adversely affect storage system or host performance of an event. For example, the event data store 164 may be meta table, and then resource limits are defined based on cache size, and/or meta table size. Definition of resource limits at 205 is optional.

In one embodiment, steps 202 and 205 may be performed programmatically. In another embodiment, steps 202 and 205 are performed during configuration of a storage controller. In one embodiment, steps 210-230 and 250-280 are performed by components of the pre-fetch manager 160 in any type of processing system.

At 210, an occurrence of a defined event is detected. The occurrence of the defined event may be detected based on a detection method included in the event detection API, where the method determines one or more system events identifying an associated non-sequential read operation. For example, a defined event may include a processing system boot. During a boot sequence, a host may request a master boot record followed by data for operating system components including the system kernel. Caching some or all of the data from these read operations in cache memory 180 may speed the boot process over retrieving the data directly from storage device 190.

Returning to FIG. 2, a determination is made at 220 as to whether or not a pre-fetch list for the defined event is valid. If an occurrence of a defined event has been issued by the host and detected by the pre-fetch manager, a pre-fetch list may have been created for the defined event. When a first occurrence of a defined event occurs and is detected by a pre-fetch controller, no pre-fetch list will exist. Hence, the determination at 220 will result in an indication that a pre-fetch list is invalid.

A pre-fetch list includes a list of read requests associated with a defined event which were previously used to retrieve data for the defined event. The pre-fetch list is stored in the record 400 at the PrefetchIOList field.

Whether a pre-fetch list remains valid for use in retrieving pre-fetch data to cache memory 180 is determined by pre-fetch data maintenance 270. Pre-fetch data maintenance 270 may include any number of valid data checks on the pre-fetch list. In one embodiment, pre-fetch data maintenance 270 includes a review of a cache hit rate for data associated with the pre-fetch list (set in PrefetchCacheHitThreshold). In another embodiment, pre-fetch data maintenance includes a review a cached data expiration time defined relative to the defined event (set in PefetchDataRetentionTime). In some embodiments, while pre-fetch maintenance 270 can be utilized to set the pre-fetch list to an invalid state, in other embodiments, the pre-fetch maintenance 270 need not be utilized.

If a pre-fetch list is invalid at 220 or does not exist at 220, then at 230, as read requests are received, the pre-fetch controller records read requests and creates a pre-fetch list of events which may be stored in the defined event record data 400. As noted herein, the defined event data record includes a list of each of the read events and the data locations of each of the read events. At 240, the pre-fetch list is marked valid. This occurs, in one embodiment, by setting the PrefetchIOListValid bit in the defined event record data 400 shown in FIG. 4. Where the event record indicates the pre-fetch list is valid, a subsequent occurrence of the defined event in the will yield a positive result at 220.

If a pre-fetch list is valid 220, at 225 a determination is made as to whether the data requested by the defined event is already present in cache memory 180 and is valid data. If the requested data is already in cache memory 180, the requested data may be returned to the host directly from the cache at 265. The data requested may be present in the cache as a result of a previous pre-fetch of the data and is returned from the cache if the data contained therein is from the correct block addressed in the read request. After returning the data from the cache at 265, the method moves to step 270 to perform pre-fetch maintenance and to step 280 to await the next event detection at 210. Pre-fetch maintenance 270 need not be performed for each return of cache data at 265. In one embodiment, no pre-fetch maintenance is performed. In the embodiment illustrated in FIG. 3, pre-fetch maintenance is performed after a defined age of the pre-fetch data.

If, at 225, the requested data is not in the cache memory 180, then at 250 the pre-fetch list read requests are replayed. As the read requests are replayed, data from each of the read requests is stored at 260 in the cache memory 180.

Once data is stored at step 260, at 265 the controller returns data from the storage device 190 to the host 110 in response to the defined event. Data returned at 265 is valid data under one or more considerations, including a time-to-live value which may be provided by the cache controller, as well as whether a pre-fetch list used to retrieve the data is valid following analysis by pre-fetch data maintenance 270 described below. One or both factors may operate to either remove pre-fetch data from cache memory 180 using any of a number of cache maintenance schemes. Information from read operations performed on the cache memory 180 when returning data to the host is utilized during the pre-fetch meet pre-fetch maintenance step 270 described below.

Pre-fetch maintenance at 270 determines whether or not cached data stored in cache memory 180 should be utilized based on one or more maintenance factors. A first maintenance factor can include the age of the pre-fetch list. A second maintenance factor may include the age of the data in the cache memory 180. Another maintenance may include the cache hit rate on subsequent occurrences of defined event reads for data for the defined event. A specific example of pre-fetch maintenance 270 is illustrated in FIG. 3.

Figure 3:
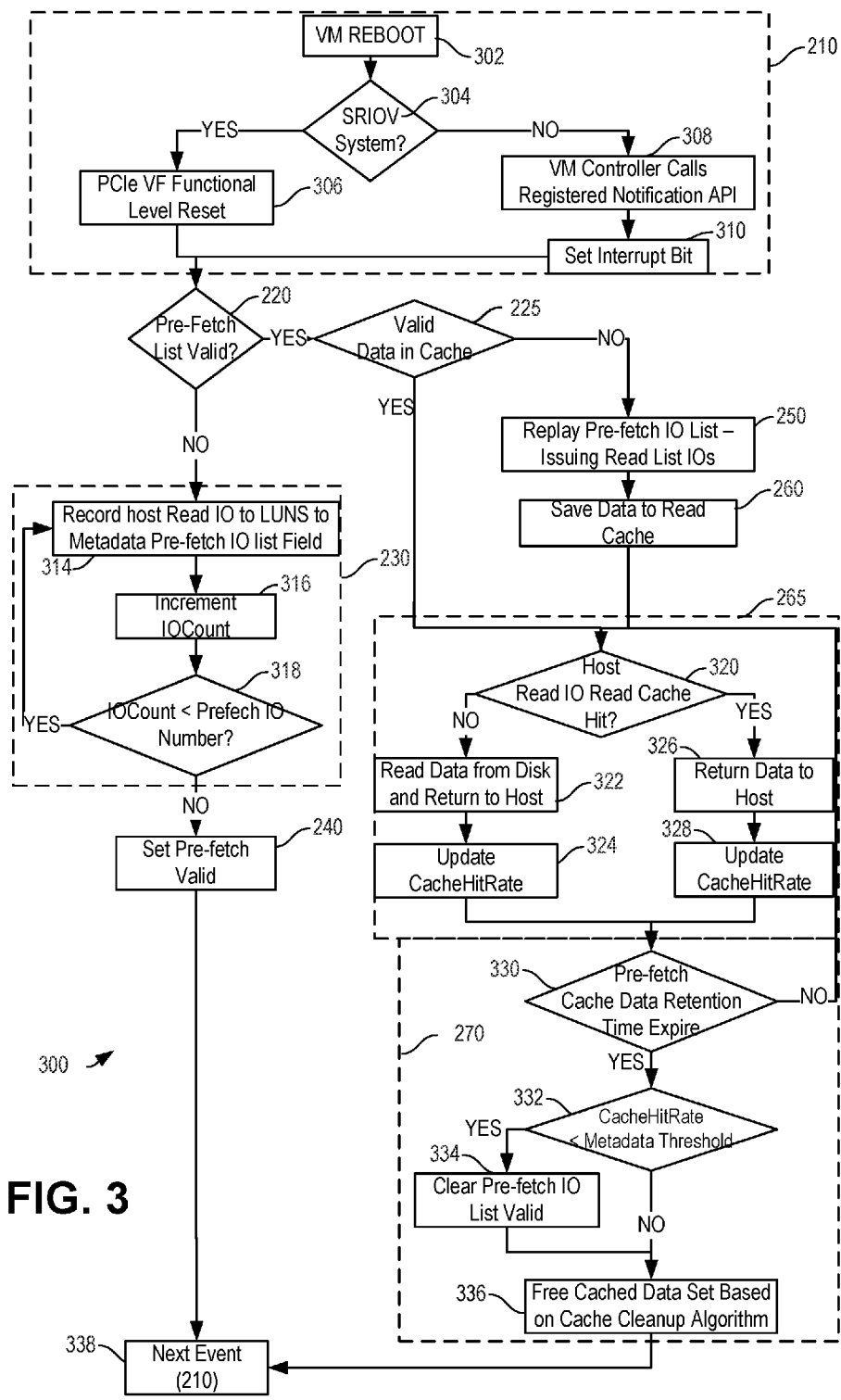
FIG. 3 is a flowchart illustrating a specific example of the process of FIG. 2 in a virtual device storage controller.

FIG. 3 illustrates a process 300 which is one example of the process 200 of FIG. 2 where a host device such as a virtual machine accesses a storage device 190 in a virtual machine environment such as a virtual desktop infrastructure. A virtual desktop infrastructure (VDI) is the practice of hosting an operating system within a virtual machine (VM) running on a host processing hardware such as a server. In FIG. 3, the defined event is illustrated as a boot of the virtual machine.

One issue with VDI systems is a VDI boot storm. A VDI boot storm is the degradation of service that occurs when a significant number of end users boot up within a very narrow time frame and overwhelm a host with data requests. Caching can cure many issues involved with VDI boot storms, but many VDI boots involve non-sequential read requests. A similar issue to VDI boot storms are VDI login storms, which are caused when a significant number of end users launch their operating systems (OSs) at the same time, and VDI antivirus storms, which happen when a significant number of virtual desktops are scheduled to run malware scans at the same time.

As illustrated in FIG. 3, detecting a defined event at step 210 may encompass a series of steps 302-310. For each defined event, step 210 may include a different series of sub-steps, based on the type of event detected. The example of FIG. 3 illustrates detection of a virtual machine boot or reboot. At 302, the virtual machine boot (VM BOOT) API detection method detects a defined event, in this case a boot or reboot of a virtual machine instance. The VM boot API detection method is reflected in FIG. 3 as examining a number of various specific inputs from the host. An initial input may be an operating system event detected by the API detection method which signals the boot or reboot sequence. At 304, a determination is made as to whether or not the system is a Single Root I/O Virtualization (SR-IOV) system.

The SR-IOV interface allows a device, such as a network adapter, to have separate access to its resources among various PCIe hardware functions. These functions consist of both physical PCIe functions and virtual functions. If the system is a SR-IOV system, then a PCIe virtual function level reset is performed at 306. If not, then at 308, a VM monitor registered notification application programming interface is called at 308. A VM monitor (VMM) or "hypervisor" is a piece of computer software, firmware or hardware that creates and runs virtual machines. The processing hardware on which a VMM is running one or more virtual machines is defined as a host machine and allows for asynchronous interrupts (generally referred to as a "doorbell") to a virtual machine instance. These interrupts may be enabled by an instruction to send an interrupt to the appropriate guest virtual machine. As such, an interrupt or "doorbell" bit is set at 310. It should be recognized that for different VM architectures, other alternatives to steps 306 and 310 may be utilized.

At 220, a determination is made as to whether the pre-fetch list is valid by checking a pre-fetch list valid bit in the defined event record. One implementation for setting the bit to valid or invalid is described with respect to various steps in FIG. 3.

If the pre-fetch list is not valid at 220, then the functions of step 230 to record the I/O events are performed. In the embodiment of FIG. 3 this involves steps 314, 316, and 318.

At 314, host read I/O events to particular Logical Unit Numbers (LUNs) are recorded. These read events are stored in the event record data and include the pre-fetch list in this embodiment.

For each I/O event (read) at 316, an I/O count is incremented. For each defined event, the event data 400 specifies an event count PrefetchIONumber. The I/O count is a specific number of input output operations which may be performed for any defined event. Read events are recorded at 316 and the count incremented at 318 until a defined pre-fetch I/O count for the event is reached, at which point the record is set to valid at 240.

Once a next occurrence of the same defined event occurs at 220, the created pre-fetch list will be determined to be valid.

When a pre-fetch list is valid at 220, at 225 a determination is made as to whether the data requested by the defined event is already present in cache memory 180 and is valid data. If the requested data is already in cache memory 180, the requested data may be returned to the host directly from the cache at 265. After returning the data from the cache at 265, the method moves to step 280 to await the next event detection at 210.

If, at 225, the requested data is not in the cache memory 180, then at 250 the pre-fetch I/O list is replayed based on the stored list in the event data. The pre-fetch controller issues the read I/O list commands at 250, and storage system data is saved to the read cache at 260 as described above with respect to FIG. 2.

Once pre-fetch data exists in the cache memory 180, the pre-fetch data for the defined event is supplied in response to read requests for the event. Step 265 is illustrated as including steps 320-328 in FIG. 3. Providing pre-fetch data from the cache memory 180 involves determining whether the data in the cache corresponds to the requested data. If a change in the read requests has occurred between the point at which data was stored in cache memory 180 and the next event of a defined event, the read requests may not match data in the cache. As such, a cache miss may occur.

At 320, a determination is made as to whether, for each data block requested, a cache hit is occurs. A cache hit is a return of valid data based on an I/O request to specific logical unit number. If a particular defined event has a read pattern which has changed since the last pre-fetch list was created, a request may be made to a different logical unit number and hence will result in a cache miss. If the cache hit occurs at 320, then data is returned to the host from the cache memory at 326 and the cache hit rate is updated at 328. If a cache hit is does not occur (a cache miss occurs) at 320, then data is read from the storage device 190 and returned to the host at 322 and the cache hit rate is updated at 324.

The cache hit rate threshold (PrefetchCacheHitThreshold) is one factor utilized in pre-fetch maintenance at 270. Another factor is a pre-fetch data retention time (PefetchDataRetentionTime). At 330, a pre-fetch cache data retention time timer is checked. The pre-fetch cache retention time is set for each event the event data 400 of FIG. 4. The data retention time is the time that the storage controller should keep the pre-fetch data in the read cache. Timing is limited since certain records will change over time. The time limit ensures that data returned by the pre-fetch cache is current data. For example, a virus scan pre-fetch should ensures that the latest virus definitions are returned by the pre-fetch cache.

In the embodiment of FIG. 3, if the pre-fetch data retention time has not expired at 330, data may continue to be returned at 320.

If the pre-fetch data retention time has expired at 330, then the cache hit rate is checked at 332. If the cache hit rate is less than the threshold defined in record 400, the pre-fetch I/O list is set invalid at 334 and the cache data cleared using the cache garbage control algorithm at 336.

It should be noted that the maintenance step 270 may have any number of various embodiments. In one embodiment, retention time only is utilized, and the pre-fetch list is set invalid after a predetermined time (Steps 332-336 are skipped). The PrefetchCacheHitThreshold time, like all other components of the defined event, can be changed based on each individual event defined. Similarly, a cache hit rate alone may be utilized in maintenance 270. In such embodiment, step 330 is skipped and only the cache hit rate is checked during each pre-fetch from the cache. In yet another embodiment, ordering of steps 330 and 332-336 may be reversed, so that the pre-fetch data retention time is checked at 330 only if the cache hit rate determines to set the pre-fetch list invalid.

Figure 5:
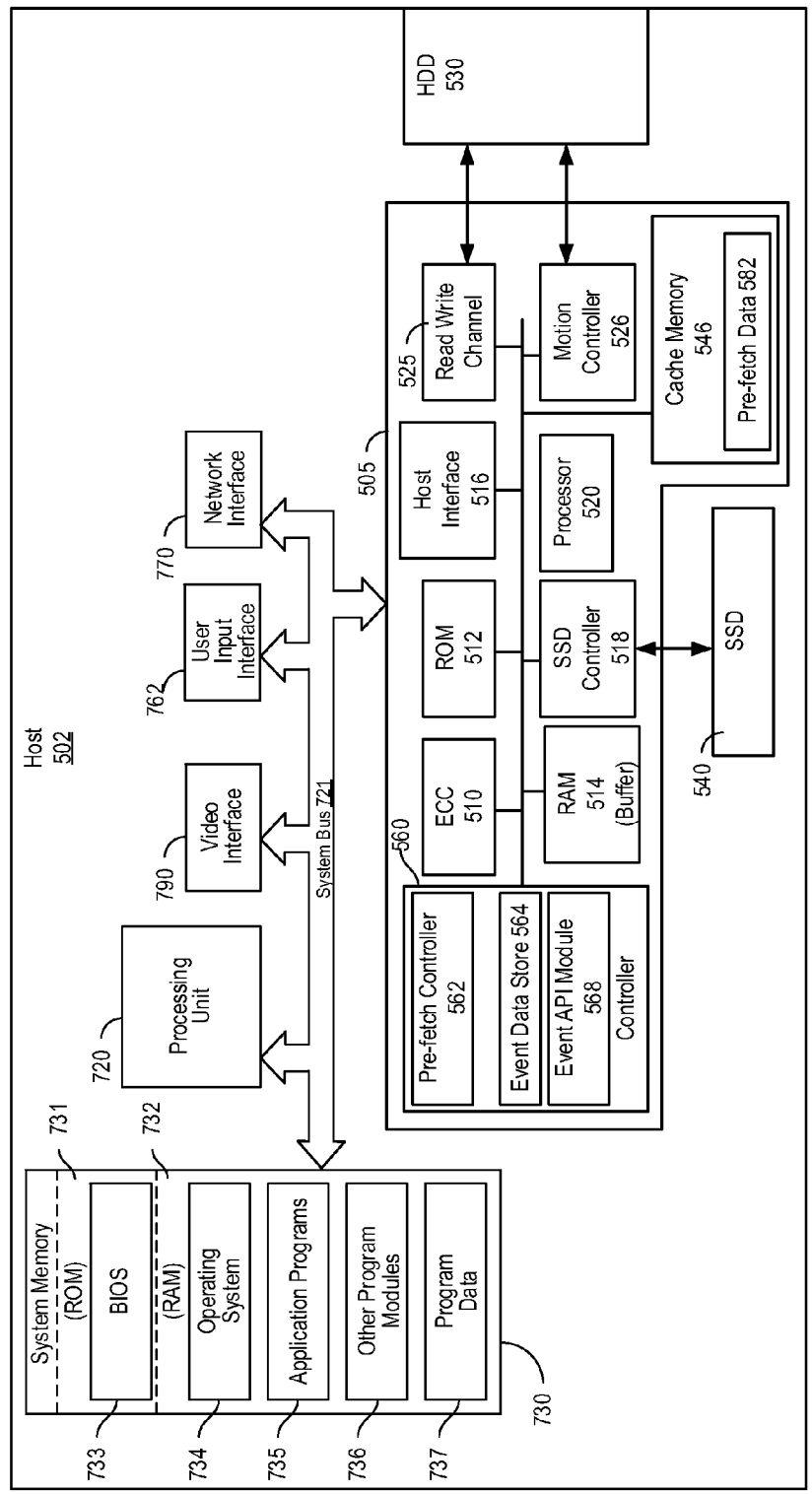
FIG. 5 is a block diagram illustrating a host incorporating a storage controller in accordance with the present technology.

FIG. 5 illustrates another embodiment of a host processing device 502 wherein the storage controller 505 is implemented as a peripheral device within a host device 502.

With reference to FIG. 5, an exemplary host device 502 for implementing the present technology may include a general purpose computing device in the form of a computer having incorporated therein a storage controller 505 incorporating the present technology. Components of host device 502 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Host device 502 typically includes a variety of computer readable media. Computer readable media can be any available media that can be accessed by host device 502 and includes both volatile and nonvolatile media, removable and non-removable media. By way of example, and not limitation, computer readable media may include computer storage. Computer storage media includes both tangible, and non-transitory, volatile and nonvolatile, removable and non-removable media for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by host device 502.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within host device 502, such as during start-up, is typically stored in ROM 731. RAM 732 typically contains data and/or program modules that are immediately accessible to and/or presently being operated on by processing unit 720. By way of example, and not limitation, FIG. 5 illustrates operating system 734, application programs 735, other program modules 736, and program data 737.

The host device 502 may also include other tangible removable/non-removable, volatile/nonvolatile computer storage media. By way of example only, FIG. 5 illustrates a hard disk drive 530 but the system may further include any type of magnetic disk drive that reads from or writes to a removable, nonvolatile magnetic disk and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 5, provide storage of computer readable instructions, data structures, program modules and other data for the host device 502. In FIG. 5, for example, RAM 732 is illustrated as storing operating system 734, application programs 735, other program modules 736, and program data 737. A user may enter commands and information into the host device 502 through input devices such as a keyboard and pointing device coupled to a user input interface 762. These and other input devices are often connected to the processing unit 720 through a user input interface 762 that is coupled to the system bus, but may be connected by other interface and bus structures, such as a parallel port, game port or a universal serial bus (USB). A monitor or other type of display device is also connected to the system bus 721 via an interface, such as a video interface 790.

The host device 502 may operate in a networked environment using logical connections to one or more remote computers. The remote computer may be a personal computer, a server, a router, a network PC, a peer device or other common network node, and typically includes many or all of the elements described above relative to the host device 502. A network interface 770 provides in interface to a local area network (LAN) and a wide area network (WAN), but may also include other networks. When used in a LAN networking environment, the host device 502 is connected to the LAN through a network interface or adapter 770. In a networked environment, program modules depicted relative to the host device 502, or portions thereof, may be stored in the remote memory storage device.

The storage controller 505 includes an error correction controller (ECC) 510, read only memory 512, random access memory 514, processor 520, as well as a motion controller 526 and storage device interfaces including a read write channel 525 and SSD controller 518. An SSD controller 518 interfaces with SSD memory 540, while the read/write channel 525 and motion controller 526 interact with HDD 530.

Storage controller 505 includes the pre-fetch manager 560 having included therein a pre-fetch controller 562, event data store 564, and event detection API module 568, each of which is equivalent to pre-fetch controller 162, event data store 164, an event detection API module 168 illustrated in FIG. 1. Also illustrated in storage controller 505 is cache memory 546, including pre-fetch data 582, and error correction controller 510, read only memory 512, random access or nonvolatile memory 514, a host interface 516, and a processor 520.

Numerous elements of the controller are implemented in hardware or a combination of hardware and software. In the embodiment of FIG. 5, the pre-fetch controller 560 may be implemented in hardware, or a combination of hardware and code instructing the processor 520 to implement the functions described herein for the pre-fetch controller 562, event data store 564, an event detection API module 568.

The host interface 516 provides a standard protocol for the HDD 530 drive to talk to host device 502. Some of the major interfaces are ATA, SCSI, and Serial interfaces. Random access memory 514 allows a number of functions by processor 520 to extract code and perform operations in reserved memory space within the random access memory as needed to support control of the hard disk drive 530 or solid-state memory 540. Random access memory 514 may include a buffer under the control of the processor 520, the buffer providing arbitration and raw signal control to processor. The main task of the read/write channel 525 is to oversee and manage the transfer of data between the disk interface and the host.

The ECC 510 is responsible for appending ECC symbols to the user data and also to check and, if needed, correct the user data before it is returned to the host. Motion controller 526 may also be referred to as a servo controller and includes servo logic used in aiding the spinning of the discs and in the positioning of the actuator on the disc in HDD 530. The processor 520 of the HDC can be implemented in multiple ways.

The computing system environment host device 502 is only one example of a suitable computing environment and is not intended to suggest any limitation as to the scope of use or functionality of the technology. Neither should the computing environment host device 502 be interpreted as having any dependency or requirement relating to any one or combination of components illustrated in the exemplary operating environment of host device 502.

FIGS. 6 and 7 illustrate two embodiments where the pre-fetch controller may reside in a processing system environment. FIGS. 6 and 7 illustrate the use of the storage array controller 625 and a network storage controller 725 incorporating the pre-fetch manager with respect to virtualized machines. In the embodiment of FIG. 6, the storage manager may be a storage manager associated with the storage array 640. Storage array controller 625 may be physically implemented as a component of the storage array controller 625, wherein the storage array controller 625 controls any number of devices within storage array 640.

A virtual machine system 600 may include for one or more hardware systems 602 supporting a virtual machine environment operating in system memory 645, a VM monitor 610, multiple virtual machines 615, a virtualization layer 620, and a storage array controller 625. A processor 630 and physical storage array 640 are also illustrated, and memory 645. One or more virtual machines 615 are integrated with virtualization layer and virtualization controller. Each virtual machine system 600 may be hosted by one or more physical host devices 602, each of which may include a device such as host device 502 of FIG. 5. Each host system includes a processor and memory 645.

The virtual machine monitor is a component that implements virtual machine hardware extraction, and is responsible for running a guest VM operating system. The virtualization layer is software responsible for hosting and managing virtual machines. This virtualization layer generally runs directly on system hardware. The depiction of FIGS. 6 and 7 illustrate one type of virtualization system and the technology may be implemented in various types of virtualization architectures.

Storage array controller 625 includes cache memory 680 equivalent to memory 180 of FIG. 1, a storage management module 652 equivalent to module 152, and the pre-fetch manager 660 having included therein a pre-fetch controller, event data store, and event detection API module (not illustrated), each of which is equivalent to pre-fetch controller 162, event data store 164, an event detection API module 168 illustrated in FIG. 1.

Virtualization system 700 may include for one or more hardware systems 602 supporting a virtual machine environment operating in system memory 645, a VM monitor 610, multiple virtual machines 615, a virtualization layer 620, and a network storage array controller 725. The network storage array controller 725 is coupled to one or more storage arrays 740, 742,744, and 746.

Storage array controller 725 includes cache memory 780 equivalent to memory 180 of FIG. 1, a storage management module 752 equivalent to module 152, and the pre-fetch manager 760 having included therein a pre-fetch controller, event data store, and event detection API module (not illustrated), each of which is equivalent to pre-fetch controller 162, event data store 164, an event detection API module 168 illustrated in FIG. 1.

The technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

The technology advantageously provides a cache memory management technique suitable for retrieving non-sequential data requested by a host system to enable faster retrieval of the non-sequential data. The cache memory technology described herein may be configured to increase the performance of any of numerous types of hosts and storage systems. The technology improves the read performance and shortens the processing time require for any type of defined event where non-sequential data is used by a processing device. The technology improves the performance of virtual systems where numerous virtual machines attempt to access the same data at a nearly simultaneous time. The technology allows for caching of non-sequential read requests for events where previously only sequential read requests for such events were utilized. The technology allows for per-event configuration of the number of read requests made, storage of the read requests made, and validity of the read requests made. The technology advantageously maintains fresh pre-fetch lists on a per event basis to ensure pre-fetched data used in accordance with the technology is current data. The technology may be implemented in various types of storage controllers and is applicable to improve numerous types of defined events.

In accordance with the above advantages, the technology includes: a means for detecting a defined event from a computing host where the event causes an event read sequence of read requests for data from non-sequential storage blocks of a storage system is provided; a means for recording the event read sequence of read requests for data to create a pre-fetch list of the read requests in the event read sequence; and a means for issuing each of the read requests for the valid pre-fetch list associated with the defined event to store the requested data in the cache memory. In addition to the foregoing means, the technology includes in combination with the foregoing means a means for determining whether data from the cache memory for the defined event is present in the cache memory, and means for determining whether a cache hit rate on data returned by the cache memory responsive to the defined event is below a threshold cache hit rate. In addition to the foregoing means, the technology includes in combination with the foregoing means a means for determining whether data from the cache memory for the defined event is present in the cache memory and the age of the data in the cache memory.

In the aforementioned description, the figures present various embodiments of processing using a reference image and an array image. In embodiments where processes are performed on ones of array images of a commonly exposed set of array images, parallel processing of any number of array images from a set may occur in relation to a reference image in order to increase processing speed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processor implemented method, comprising:
configuring the processor to detect at least one defined event having a defined event definition, the configuring being prior to issuing any read sequence to access data in a storage system for the at least one defined event;
detecting an occurrence of the at least one defined event from a host, the occurrence of the defined event comprising a sequence of read requests for data from non-sequential storage blocks of a storage system;
recording the sequence of read requests for data to create a pre-fetch list of the read requests in the read sequence; and
issuing each of the read requests for the pre-fetch list associated with the defined event to store the data in a cache memory.

2. The processor implemented method of claim 1 wherein the issuing occurs following detecting a subsequent occurrence of the defined event.

3. The processor implemented method of claim 1 wherein the recording occurs upon detection of the defined event and determining an invalid pre-fetch list, the recording thereafter creating the pre-fetch list and setting the pre-fetch list to valid.

4. The processor implemented method of claim 1, the method further comprising:
returning the data from the cache memory to the host, and determining whether a cache hit rate on data returned by the cache memory responsive to the defined event is below a threshold cache hit rate, and if the cache hit rate is below the threshold, setting the pre-fetch list to invalid.

5. The processor implemented method of claim 1 wherein the recording occurs on a first occurrence of the defined event, and the issuing occurs on each subsequent occurrence after the first occurrence of the defined event.

6. The processor implemented method of claim 1 wherein the event definition includes at least a number of read requests to be made, a threshold validity of read requests to be made and a storage retention time.

7. The processor implemented method of claim 1 wherein the pre-fetch list comprises at least a logical unit number, a start logical block address and number of blocks.

8. The processor implemented method of claim 1 further comprising determining whether the pre-fetch list exists as a result of a previously executed defined event, and the issuing comprising issuing the read requests from the pre-fetch list from the previously executed defined event.

9. The processor implemented method of claim 1 wherein the issuing occurs after a subsequent occurrence of the defined event and based on a valid pre-fetch list for the defined event.

10. A storage controller coupled to a host and a storage system, comprising:
a cache memory;
a cache controller operably coupled to the cache memory, the cache controller configured with at least one defined event definition prior to the cache controller issuing any read requests to the storage system, the cache controller comprising:
an event detector adapted to detect an instance of a defined event issued by the host, the defined event having a defined event definition including at least a number of read requests to be made, a threshold validity of read requests to be made and a storage retention time, the instance comprising a plurality of read requests for data from non-sequential storage blocks of the storage system; and
a pre-fetch controller adapted to create a pre-fetch list associated with the defined event, record the plurality of read requests for the defined event to create the pre-fetch list, set the pre-fetch list as a valid pre-fetch list, issue each of the read requests for the pre-fetch list associated with the defined event, and store data returned responsive to the plurality of read requests in the cache memory.

11. The storage controller of claim 10 further comprising an event data store, the event data store comprising for each defined event a data record, the data record comprising the pre-fetch list, a validity indicator for the pre-fetch list, and a defined event identifier.

12. The storage controller of claim 10 wherein the storage controller is adapted to determine a cache hit rate for cached data returned from the cache memory, and determine if the cache hit rate is below the threshold validity for the defined event.

13. The storage controller of claim 10 wherein the storage controller is adapted to determine an age of data stored for the defined event in the cache memory, and invalidate a pre-fetch list if the age exceeds the storage retention time.

14. The storage controller of claim 10 wherein the event detector is adapted to receive an indication from the host of an occurrence of the defined event.

15. A non-transitory computer-readable medium storing computing instructions that, when executed by one or more processors, cause the one or more processors to operate as a storage controller for a storage system by performing the steps of:
prior to the storage controller issuing any read requests to a storage system for a defined event, configuring the storage controller with an event definition for the defined event, the defined event definition including at least a number of read requests to be made, a threshold validity of read requests to be made and a storage retention time;
recording read requests from a host to the storage system to a pre-fetch list, the read requests based on a defined event for which an occurrence requests data from non-sequential storage blocks of the storage system, the defined event being one of a plurality of different defined events each having an event definition; and
reading the pre-fetch list and issuing the read requests to the storage system upon a subsequent occurrence of the defined event to store data associated with the read requests in a cache memory.

16. The non-transitory computer-readable medium of claim 15 further comprising instructions that, when executed by one or more processors, cause the one or more processors to detect a defined event from the host via an event detector provided by the storage controller.

17. The non-transitory computer-readable medium of claim 15 further comprising instructions that, when executed by one or more processors, cause the one or more processors to determine a cache hit rate for cached data returned from the cache memory, and code operable to determine if the cache hit rate is below the threshold validity for the defined event.

18. The non-transitory computer-readable medium of claim 15 further comprising code operable to determine an age of data stored for the defined event in the cache memory, and code operable to invalidate a pre-fetch list if the age exceeds the storage retention time for the defined event.

19. The non-transitory computer-readable medium of claim 15 wherein the instructions that, when executed by one or more processors, cause the one or more processors to read the pre-fetch list and issue the read requests reads such requests on a first occurrence of the defined event, and issues read requests on a subsequent occurrence of the defined event after the first occurrence of the defined event.

20. The non-transitory computer-readable medium of claim 15 wherein the instructions that, when executed by one or more processors, cause the one or more processors to read the pre-fetch list from an event data store, the event data store comprising for each defined event a data record, the data record comprising the pre-fetch list, a validity indicator for the pre-fetch list, and a defined event identifier, and the code operable to record writes the pre-fetch list for each defined event to the data record.

* * * * *